Dec. 15, 1964    R. W. MORAN    3,161,448
OUTER RING FOR ANTIFRICTION BEARING
Original Filed Oct. 31, 1961

*INVENTOR.*
RONALD W. MORAN
BY
*ATTORNEY*

United States Patent Office 3,161,448
Patented Dec. 15, 1964

3,161,448
OUTER RING FOR ANTIFRICTION BEARING
Ronald W. Moran, New Britain, Conn., assignor to The Fafnir Bearing Company, New Britain, Conn., a corporation of Connecticut
Continuation of application Ser. No. 148,928, Oct. 31, 1961. This application July 5, 1963, Ser. No. 294,463
5 Claims. (Cl. 308—187)

This invention is a continuation of application Serial No. 148,928, filed October 31, 1961, now abandoned and relates to antifriction bearings, and more particularly to a new and improved outer ring construction for an antifriction bearing.

In the operation of ball bearings, it is known that the contact area between each ball and the outer bearing ring raceway is substantially elliptical. Under thrust load this contact area is displaced to one side of a plane passing radially through the bearing, and the angle of this displacement is referred to as the contact angle. Bearings are manufactured having an initial "built-in" contact angle that is valid only under static loading conditions.

The present invention in providing a new and improved structural arrangement for the outer ring, establishes the boundary edge of the outer race groove at a location close to, but just beyond, the elliptical contact area, which would result from the maximum bearing thrust static loading condition. As rotational speed is increased, the initial (static) outer ring contact angle decreases, thus shifting the ball contact area away from the boundary edge, so that full ball contact support for all speed conditions is assured.

It is an important object of the present invention also to provide a new and improved structural arrangement for the outer ring of an antifriction bearing.

A principal object of the present invention in providing an improved outer ring structural arrangement is to confine the bearing lubricant to an area close to the elliptical contact area where it is utilized most effectively.

A further object of the invention is to provide a structural arrangement in an antifriction bearing, where grease lubrication is used, to reduce the loss of lubricant substantially, thus improving the bearing life.

Also it is an object of the invention to provide a new and improved antifriction bearing to operate at a lower bearing temperature than has been achieved in the past.

Briefly, in accordance with the above objects, features and advantages, the invention provides a bearing outer ring construction which incorporates a recess or cavity on at least one side of the outer race groove and, preferably, on both sides thereof.

Other objects and advantages of the invention will be pointed out in the following description and claims and illustrated in the accompanying drawings which disclose, by way of example, the principle of the invention and the best mode which has been contemplated of applying that principle.

Figure 1:
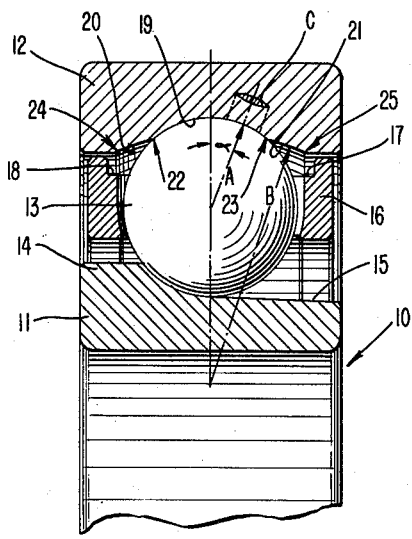
FIG. 1 is a fragmentary view, partly in cross-section, of an angular contact type ball bearing having an outer ring in accordance with the invention.

Referring now to FIG. 1 of the drawings, a bearing 10 includes an inner bearing ring 11 and an outer ring 12. An antifriction element 13 is shown in the form of a ball to illustrate a ball bearing for the purposes of this description.

The inner ring 11 has a built up portion 14 around one outer edge and a cut-away section 15 around the opposite edge in accordance with a customary angular contact type ball bearing. Under thrust load applied in the sense of the arrows A–B in FIG. 1, the contact area for a ball element 13 against the outer race is substantially elliptical as suggested by the projection C in FIG. 1. This contact area is displaced to one side of the plane which passes radially through the ball centers and the angle of this displacement about the ball center is referred to as the contact angle, designated α in FIG. 1.

A ball retainer 16 is provided with a groove or channel 17 adjacent one side of the ball 13 and a groove or channel 18 adjacent the opposite side of the ball 13. Both of these channels 17, 18, may take the form of a single wide continuous circumferential annular channel on the outer portion of the retainer body 16. This form of bearing retainer is the subject matter of my copending application Serial No. 101,130, filed April 6, 1961, Patent No. 3,121,597.

The outer bearing ring 12 is formed with a race groove 19 to receive a portion of each ball 13. In addition, the outer ring 12 is provided with two recesses or grooves 20 and 21 extending annularly around opposite annular edges of the race groove 19.

The dimensions of each recess or groove 20 and 21 are such that the boundary edges or points 22 and 23 are located outside of any contact area which possibly could exist between the ball 13 and the ring 12 under the maximum thrust load conditions. In other words, when a maximum thrust load is applied against the outer ring 12 to the left as viewed in FIG. 1, the contact area between the race 19 and the ball 13 will shift to the right and the contact area between the ball 13 and the groove 19 will not reach the point 23. Accordingly, since there can be no contact between the points 22, 23 and the ball a high loading stress gradient with attendant undesirable excessive loading on the ball 13 at these points cannot result.

It is also preferable that the points 24 and 25 representing the outer annular boundary of the recesses or grooves 20 and 21 shall fall within the width of the retainer 16.

In the form of the invention shown in FIG. 1, the race groove 19 has a radius indicated by the arrow "A," and the radius of the recesses 20 and 21 is indicated by the arrow "B."

Figure 2:
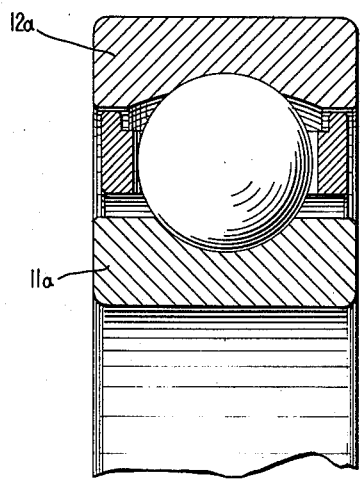
FIG. 2 is a view similar to FIG. 1, but illustrating the invention in connection with a Conrad type bearing.

In FIG. 2 of the drawings, the construction of the outer bearing ring 12a is similar to that shown in FIG. 1, but the inner bearing ring 11a is illustrated as being of the Conrad type. This is to illustrate that the invention is adapted readily for use with various forms of bearings.

Figure 3:
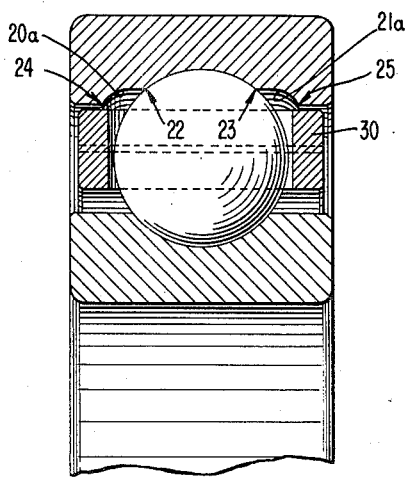
FIG. 3 is a view similar to FIG. 2, but showing a conventional bearing retainer.

In FIG. 3, a conventional ball bearing retainer 30 is illustrated for the purposes of indicating that the invention is not restricted to use with the type of retainer 16 shown in FIG. 1. In addition, recesses or grooves 20a and 21a are shown in FIG. 3 as having a slightly different configuration from that shown in FIG. 1. However, it should be noted that the points 22, 23, 24 and 25 are located similarly as shown in FIG. 1, and the same reference numerals have been used to indicate these corresponding points.

Figure 4:
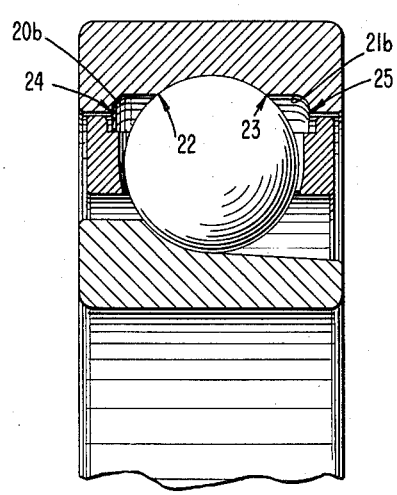
FIG. 4 is a view similar to FIG. 1, but showing two annular grooves in the outer ring having different configurations from those shown in FIG. 1.

FIG. 4 of the drawings shows a bearing cross-section similar to that shown in FIG. 1, with the exception that the recesses or grooves 20b and 21b have a slightly different configuration to illustrate that the invention is not limited to any specific configuration for the recesses or grooves. However, the points 22–25 in FIG. 4 are located similarly as those shown in FIGS. 1, 2 and 3, but the same reference numerals have been used to indicate these points.

It should be noted that in the figures the various recesses 20, 21 and 20a, 21a, adjacent the outer race grooves 19 are formed by portions of the inner wall immediately adjacent the grooves which have progressively greater radial dimensions along the points progressively closer to said grooves. When the bearing assembly is rotated, the resulting centrifugal action directs the lubricant outwardly into the annular circumferential cavities formed by the channel 17 and recess 21 and the channel 18 and recess 20. Due to the centrifugal forces and the slope of the recess walls 20, 21 and 20a, 21a, the lubricant is constantly urged into the region where it is most effectively utilized, that is, in the outer race groove 19. Moreover, due to the sloping or curved surfaces of the recess boundaries 20, 21 and 20a, 21a, a certain amount of lubricant is maintained adjacent the balls and can never be forced out of the bearing by reason of centrifugal force as in conventional bearings. Moreover, the provision of the circumferential cavities formed by the channels 17 and 18 with the recesses 21 and 20 respectively, greatly reduces shearing or churning of the lubricant between the retainer and the outer race, thus eliminating the undesirable high temperature rise encountered during the break-in period of conventional bearings.

Additionally, it will be obvious, as noted earlier in the specification, that the advantages of the invention can be achieved with the use of a single recess on only one side of the outer race groove, with other suitable means being provided on the opposite side of the groove to restrain the loss of grease from the bearing assembly.

Obviously, many modifications and variations of the present invention are possible in the light of the above teachings. Therefore, it is to be understood that the invention is not limited in its applications to the details of construction and arrangements of parts specifically described or illustrated, and that within the scope of the appended claims it may be practiced otherwise than as specifically described or illustrated.

I claim:
1. In a bearing having a plurality of antifriction elements and an outer bearing ring member against which said antifriction elements are adapted to act, said outer bearing ring member having an annular groove forming a race to receive a portion of each antifriction element in load supporting contact therewith, said outer bearing ring member having a first tapered annular recess on one side of said antifriction elements and a second tapered annular recess on the opposite side of said antifriction elements, said recesses each being shaped to direct a lubricant into said groove when said bearing is rotated, and the contact areas between said groove and each antifriction element being spaced from each of said recesses.

2. In a bearing having a plurality of antifriction elements and an outer bearing ring member against which said antifriction elements are adapted to act, said outer bearing ring member having an annular groove forming a race to receive a portion of each antifriction element in load supporting contact therewith, said outer bearing ring member having a first tapered annular recess adjacent one edge of said annular groove, said recess being formed by a portion of the inner wall of said ring and shaped to direct a lubricant into said groove when said bearing is rotated, and a second annular recess in said outer ring similar to said first recess on the opposite side of said antifriction elements from said first recess, the contact areas between said groove and each antifriction element being spaced from each of said recesses.

3. A bearing as set forth in claim 1 wherein said recesses are arcuate with boundaries substantially close to said antifriction elements.

4. In combination, an antifriction bearing comprising inner and outer rings with concave antifriction raceways therein, antifriction elements riding both raceways in spaced relation to each other, said bearing being of the angular contact type wherein a thrust load on one of said rings with respect to the other will produce contact of said elements with the outer race at a location axially offset from the radial plane passing through the race centers, the contact area of each of said elements with said outer race being elliptical and also being spaced from each of said recesses, said outer ring member having an annular recess adjacent that edge of the race groove which is adjacent the offset contact location of said elements with said outer race, said recess being formed by a portion of the inner wall of said outer ring and shaped to direct a lubricant into the raceway in said outer ring when said bearing is rotated, and a second annular recess in said outer ring on the opposite side of said antifriction elements from said first stated recess.

5. In a bearing having a plurality of antifriction elements and an outer bearing ring member against which said antifriction elements are adapted to act, said outer bearing ring member having an annular groove forming a race to receive a portion of each antifriction element in load supporting contact therewith, said outer bearing ring member having a first tapered annular recess on one side of said antifriction elements and a second tapered annular recess on the opposite side of said antifriction elements, said recesses each being shaped to direct a lubricant into said groove when said bearing is rotated, said recesses also being disposed symmetrically with respect to said groove, and the contact areas between said groove and each antifriction element being spaced from each of said recesses.

References Cited by the Examiner
UNITED STATES PATENTS
2,177,303  10/39  Murden _____ 308—188

FRANK SUSKO, *Primary Examiner.*